(12) United States Patent
Kaiser et al.

(10) Patent No.: US 6,393,116 B1
(45) Date of Patent: May 21, 2002

(54) METHOD FOR MANAGING A SUBSCRIBER'S TELECOMMUNICATION SERVICE DATA AS WELL AS A SERVER AND EXCHANGE THEREFOR

(75) Inventors: Bernhard Kaiser, Vaihingen; Roland Uebele, Schorndorf, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/267,162

(22) Filed: Mar. 12, 1999

(30) Foreign Application Priority Data

Mar. 13, 1998 (DE) .......................................... 198 10 869

(51) Int. Cl.[7] .............................................. H04M 3/42
(52) U.S. Cl. .............................. 379/201.12; 379/220.01
(58) Field of Search ....................... 379/201.12, 207.11, 379/201.01, 201.05, 219, 220.01, 229, 230

(56) References Cited

U.S. PATENT DOCUMENTS 6,104,796 A * 8/2000 Kasrai .................... 379/201.12

FOREIGN PATENT DOCUMENTS

| DE | 44 34082 A1 | 3/1996 |
|---|---|---|
| EP | 0 453 831 A2 | 10/1991 |
| EP | 0 781 023 A2 | 6/1997 |
| GB | 2 312 973 A | 11/1997 |
| WO | WO 94/05124 | 3/1994 |
| WO | WO 94/11849 | 5/1994 |
| WO | WO 96/25003 | 8/1996 |
| WO | WO 97/22209 | 6/1997 |
| WO | WO 97/22211 | 6/1997 |
| WO | WO 97/22212 | 6/1997 |

* cited by examiner

*Primary Examiner*—Creighton Smith
(74) *Attorney, Agent, or Firm*—Sughrue Mion, PLLC

(57) ABSTRACT

A method for managing a subscriber's telecommunication service data stored in an exchange (EX1), as well as a server (SER) and an exchange (EX1) therefor. A data terminal (DT) of the subscriber sets up a connection to the exchange (EX1) via an online data network (ODN). The data terminal (DT) sends an access request from the subscriber to the exchange (EX1). The exchange (EX1) receives the access request. The exchange (EX1) and the data terminal (DT) interactively process the data, whereby the exchange (EX1) outputs the data to the data terminal (DT) and the data terminal (DT) sends the data to the exchange (EX1) at least if the data has been modified on the data terminal (DT). Finally, the exchange (EX1) stores the modified data, and the data terminal (DT) or the exchange (EX1) terminates the connection to the exchange (EX1) via the online data network (ODN).

9 Claims, 2 Drawing Sheets

1

METHOD FOR MANAGING A SUBSCRIBER'S TELECOMMUNICATION SERVICE DATA AS WELL AS A SERVER AND EXCHANGE THEREFOR

This application is based on and claims the benefit of German Patent Application No. 198 10 869.9 filed Mar. 13, 1998, which is incorporated by reference herein.

BACKGROUND OF THE INVENTION

The present invention relates to a method for managing a subscriber's telecommunication service data stored in an exchange as well as a server therefor in accordance with the preamble of claim 6 and an exchange therefor in accordance with the preamble of claim 9.

With continuing development, telecommunications networks are offering telecommunication service users increasingly more sophisticated convenience functions. Many of these functions are provided by intelligent networks. A keyword to be mentioned, for example, is the so-called Virtual Private Network (VPN), in which a private logic network is created within a public network. This logic network appears as a homogenous private network to the subscribers of this network; it also appears as a homogenous private network toward the outside, to all subscribers that are not incorporated in this private logic network. The functions within an intelligent network arc essentially provided by so-called Service Switching Points (SSP) and Service Control Points (SCP). For example, in case of a call destined for a VPN of the aforementioned type, an SSP, in a first step, detects that the call is generally destined for the intelligent network based on the call's specially labeled dial number and requests the data required for further call setup from an SCP associated with it. In a second step, the SCP then provides, for example, the information that the call is addressed to a VPN and that an actual dial number of the subscriber connection must be used for further call setup instead of the specially labeled dial number, which is a logical dial number. Thus the data required to provide the aforementioned VPN service is centrally available in the SCP and is called off by the various SSPs. This data can be modified directly at the SCP or, for example, from a personal computer that may be very remote from the SCP and is connected to the SCP via a data line, e.g., via a line of an ISDN telecommunications network.

Other convenient features in telecommunications networks include, for example, various forms of call forwarding under specific conditions. For example, in so-called Call Forwarding Busy (CFB), a call is forwarded to a different dial number only if the originally dialed number is busy. In a so-called Call Forwarding Unconditional (CFU), a call is forwarded to a different dial number without any conditions. Such services are typical particularly in ISDN networks and are defined by uniform standards. The data required for such a service, e.g., a dial number to which the call is to be forwarded, is typically not stored centrally in an SCP as in the above example, but decentrally in the respective local exchange through which the subscriber using the service is connected to the telecommunications network. Thus, a call can first be routed to this local exchange, which can then forward the call based on locally stored data, depending on the setting, to the subscriber connection or to a predetermined dial number.

The data for the aforementioned services can be modified by the subscriber himself The subscriber dials an access identification code on his telephone, which gives him access to his personal data, and modifies the data as necessary, e.g., he actively changes call forwarding or deactivates it. The operating options on a telephone, namely voice input, voice output and keypad entry—on many telephones also data display—severely limit the convenience of data modification and the scope of the modification possibilities. Moreover, the limited maintainability of personal data decreases the likelihood that the subscriber will use these features at all and increases the error ratio during operation.

SUMMARY OF THE INVENTION

Thus, it is an objective of the invention to make telecommunication service data that is stored in an exchange conveniently accessible for modification.

This objective is attained by a method according to the technical teaching of claim 1, a server according to the technical teaching of claim 6, a server according to the technical teaching of claim 7 and an exchange according to the technical teaching of claim 9. Further advantageous embodiments of the invention are evident from the independent claims and the description.

BRIEF DESCRIPTION OF THE DRAWING

Below, the invention and its advantages are presented by means of exemplary embodiments with the aid of the drawings.

DETAILED DESCRIPTION OF THE INVENTION

Figure 1:
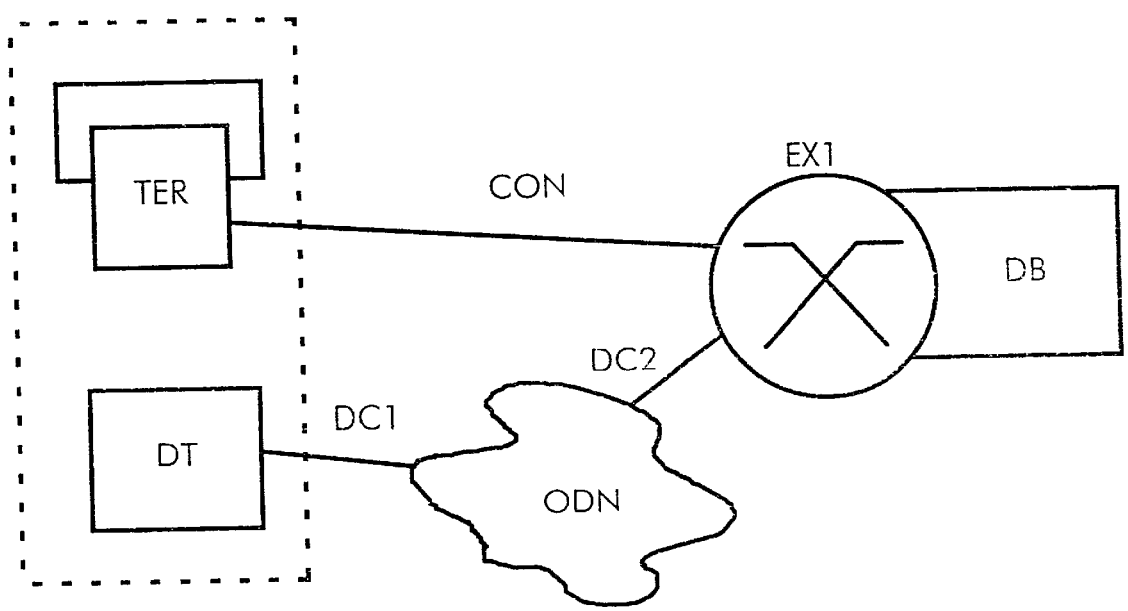
FIG. 1 shows an arrangement for implementing the inventive method comprising a terminal TER, an inventive exchange EX1 and a data terminal DT.

FIG. 1 shows an arrangement in which the inventive method may be used. A terminal TER is connected to exchange EX1 via a connection CON. This terminal TER may be a telephone, a fax machine, or some other equipment working in conjunction with a telephone network. Connection CON may lead through additional equipment not depicted in FIG. 1, e.g. through front-end equipment and additional exchanges. Exchange EX1 comprises a storage system DB to store data required for providing telecommunication services for terminal TER. With this data, exchange EX1 can, for example, forward a call destined for terminal TER to a different subscriber connection. Exchange EX1 can assume the functions of a local exchange. However, exchange EX1 can also assume central functions for post-connected exchanges (not depicted in FIG. 1), which may be located, for example, along connection CON.

FIG. 1 furthermore shows a data terminal DT connected with an online data network ODN via a connection DC1. The online data network ODN in turn is connected with the exchange EX1 via connection DC2. A typical example for the online data network ODN is the Internet. However, modifications and further developments of the Internet or other forms of data networks are also possible, e.g., an Intranet. Since data networks are generally not circuit switched but packet switched, a noticeable delay may occur during data transmission between two users of the data network. However, since said two users are interconnected via an imaginary connection, a virtual connection of the data network, the data network creates an online connection between the two users even if an occasional time delay occurs. The data terminal used may be a personal computer provided with an interface permitting access to the online data network ODN. Connection DC1 to the online data network ODN may be set up, for example, as a telephone connection via a telephone network to an access computer, not depicted in FIG. 1, which serves as an interface between the telephone network and the online data network ODN. The data terminal can then exchange data with the online data network ODN over connection DC1, e.g., via a modem or an ISDN interface module. A modem is used when connection DC1 permits only analog transmission; an ISDN interface module is used when connection DC1 permits transmission of digital ISDN data packets. In the case where the online data network ODN is the Internet, the setup of connection DC1 by means of a personal computer and suitable interface software is generally known.

Terminal TER and data terminal DT may be located in different places. However, a dash-dotted box in FIG. 1 indicates that in this example, data terminal DT and terminal TER are set up together in a single location. Data terminal DT may also be a combination unit that can set up connection DC1 with the online data network ODN and furthermore perform the functions of a telephone set. Such a combination unit can combine the functions of data terminal DT and the functions of terminal TER. This combination unit can then perform the partial functions of terminal TER as well as the partial functions of data terminal DT, for example via connection CON, in that, for example, exchange EX1 sets up a connection to the online data network ODN, or in that the online data network interface of connection DC2 at exchange EX1 can also be addressed from connection CON.

To set up a complete connection from connection DC1 to exchange EX1, data terminal DT gives the online data network ODN an address of exchange EX1. If the online data network ODN is the Internet, this address may, for example, be a so-called URL address (Uniform Resource Locator), which permits the setup with common Internet means of a connection from data terminal DT to an input interface, a so-called homepage, of exchange EX1 via the online data network ODN. The online data network ODN then sets up the complete connection up to exchange EX1 including connection DC2. Subsequently, data terminal DT sends an access request to exchange EX1 requesting access to the telecommunication service data used by exchange EX1 to provide the telecommunication services to terminal TER. The access request can, for example, be a subscriber number assigned to the subscriber connection of terminal TER.

Advantageously, exchange EX1 checks the access request to determine whether access to the telecommunication service data of the subscriber connection may be granted. For example, data terminal DT may send exchange EX1 a so-called Personal Identification Number (PIN) together with the access request. Only if the PIN entered on data terminal DT coincides with a PIN expected by exchange EX1 in conjunction with the access request, does exchange EX1 permit access to the telecommunication service data. This ensures that only an authorized subscriber or his representative can access the telecommunication service data. It may also be predetermined, however, that giving the subscriber number of the subscriber connection in itself is sufficient to obtain access to the telecommunication service data. The latter variant can be selected, for example, if the telecommunication service data is only to be read but not modified, or if the telecommunication service data can be modified to only a very limited extent in any case.

If access to the telecommunication service data cannot be granted, exchange EX1 indicates this to data terminal DT. Renewed access with different access identification, e.g., with a different PIN, can then be attempted at data terminal DT or the link between exchange EX1 and data terminal DT is disconnected.

Once the subscriber has obtained access to his telecommunication service data by means of data terminal DT, exchange EX1 and data terminal DT interactively process the telecommunication service data. Exchange EX1 sends telecommunication service data to data terminal DT, which can then output this data on an output medium, e.g., a screen or a loudspeaker. If the data is modified on data terminal DT by means of an input medium, e.g. a keyboard, data terminal DT sends this modified data to exchange EX1. Exchange EX1 stores the modified data in its storage system DB. However, the scope of the invention also covers the case where data terminal DT only reads the data but does not modify it.

With the telecommunication service data, the telecommunication service settings may be modified. For example, additional telecommunication services may be requested or the operating parameters of previously requested telecommunication services may be modified. It is possible, for example, to request various forms of call forwarding such as the aforementioned Call Forwarding Busy (CFB) or Call Forwarding Unconditional (CFU). A charge indicator for terminal TER may be requested from exchange EX1 or a so-called MCID (Malicious Call IDentification) may be set up to determine malicious calls. These services are particularly common in ISDN telecommunication networks but can be provided in other telecommunication network types as well. Other services that are not mentioned here can also be booked with exchange EX1.

If such a service has already been booked, the operating parameters for this service can be changed from data terminal DT to meet current requirements. In the case of the aforementioned call forwarding, for example, the dial number to which the call is to be forwarded may be specified and the conditions for call forwarding defined, e.g. a call is to be forwarded only if terminal TER dialed by the original caller does not answer after three or five rings.

Advantageously, data terminal DT sends only permissible data modifications to exchange EX1, in that data terminal DT checks whether the data modification is permissible before sending it. In turn, exchange EX1 can also check the data that is sent to it for plausibility and store data in the storage system DB only if it passes this plausibility check. Optimum safety is achieved, however, if both exchange EX1 and data terminal DT perform a data check.

After successful data modification or simple data reading, data terminal DT terminates the connection with exchange EX1. However, the connection can also be terminated by exchange EX1, for example, if no entry has been made on data terminal DT over a prolonged period of time so that the connection capacity of exchange EX1 is unnecessarily blocked by the unused connection to data terminal DT and a timer of exchange EX1 therefore causes the link to be disconnected.

During interactive processing of telecommunication service data, exchange EX1 can send telecommunication service data in its present form to data terminal DT, which data terminal DT then interprets and displays in a display menu for a user of data terminal DT. In turn, data terminal DT sends exchange EX1 only the initially mentioned access identification and PIN, its requests for telecommunication service data and user entries or modifications of telecommunication service data. In this case, data terminal DT takes care of interpreting the received telecommunication service data, displaying it in display menus and, where indicated, checking data entered on data terminal DT, by means of software permanently installed in a storage medium of data terminal DT from where it can be called up. However, exchange EX1 and data terminal DT can also exchange telecommunication service data enriched with additional interpreting instructions. In this case, exchange EX1 sends the telecommunication service data, for example, together with an additional instruction for display setup or an additional instruction for acoustic output of the data to data terminal DT. Thus, the form of the output on data terminal DT is directly controlled by exchange EX1 and both modifications and expansions of this output form can be centrally issued by exchange EX1 and are no longer dependent on software permanently installed in a storage medium of data terminal DT. In this case, data terminal DT has only evaluating means for interpreting the instructions sent by exchange EX1.

If the online data network ODN is the Internet, the description language HyperText Markup Language (HTML) can be used for the aforementioned exchange of expanded data between exchange EX1 and data terminal DT. In this case, exchange EX1 sends so-called HTML documents to data terminal DT consisting of a sequence of ASCII (American Standard Code for Information Interchange) characters, which are then read and interpreted by data terminal DT using a special evaluation program, a so-called browser. The syntax of the HTML documents is precisely defined and makes it possible, for example, to describe the type of the written representation of screen records or even entire acoustic sequences by means of the HTML description language. The data terminal DT can edit received telecommunication service data on input fields of a screen record such that the user can modify the data displayed on the data terminal and the data terminal DT can return the modified data to exchange EX1.

As a further development of the description possibilities of information with HTML documents, the language JAVA offers expanded options for data output and, in particular, for interactive data modification. When using JAVA, exchange EX1 sends an intermediate code generated from a compiled source text, a so-called JAVA applet, to data terminal DT. Data terminal DT translates this JAVA applet into machine code by means of a JAVA interpreter and subsequently executes the machine code program thus generated, i.e., it produces picture sequences, acoustic sequences, or input masks for telecommunication service data. Since communication means of the Internet protocol family TCP/IP (Transmission Control Protocol/Internet Protocol) can also be integrated in the JAVA applets, the return of modified or unmodified telecommunication service data, or also control commands from data terminal to exchange EX1 is substantially facilitated.

Figure 2:
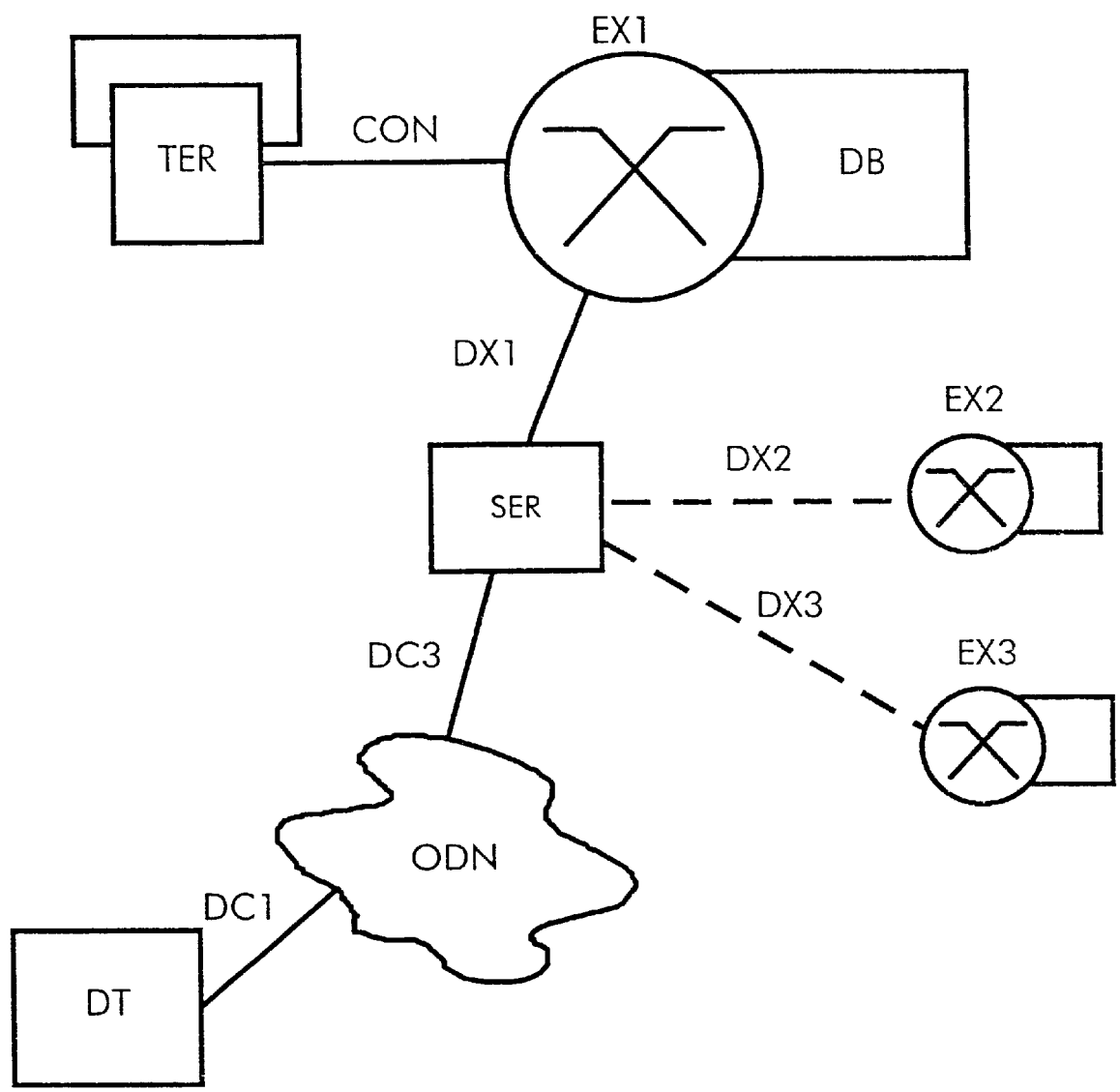
FIG. 2 shows a preferred further development of the arrangement of FIG. 1 for implementing the inventive method comprising a terminal TER, three inventive exchanges EX1, EX2 and EX3, an inventive server SER and a data terminal DT.

A preferred further embodiment of the inventive method is shown in FIG. 2. FIG. 2 shows on the one hand, the components previously described in connection with FIG. 1, namely data terminal DT connected with online data network ODN via connection DC1 and terminal TER connected with exchange EX1 via connection CON. On the other hand, the figure also shows an exchange EX2, an exchange EX3, and a server SER that permits subscribers to access their telecommunication service data stored in exchanges EX1, EX2, and EX3 as well as in other similar exchanges not shown in FIG. 2.

For clarity's sake, terminal TER and data terminal DT of FIG. 2 are not arranged together as in FIG. 1, but in different locations. This type of arrangement also makes it clear that maintenance, which will be further explained below, of the telecommunication service data in exchanges EX1, EX2, and EX3 can be performed from different locations using data terminal DT.

When the subscriber enters an access request to access his telecommunication service data from his data terminal DT, data terminal DT first sets up a connection DC1 with online data network ODN and is then connected with server SER via online data network ODN and connection DC3. When server SER receives the access request, server SER determines in which of the exchanges EX1, EX2, or EX3 the subscriber's telecommunication service data is stored. For this purpose, server SER evaluates, for example, a subscriber number of the subscriber given in conjunction with the access request and determines to which exchange, EX1, EX2, or EX3, the subscriber connection with the indicated subscriber number belongs. The description below assumes that the telecommunication service data for which access is requested from data terminal DT is stored in exchange EX1. Server SER therefore sets up connection DX1 to exchange EX1. Connection DX1 can, for example, be a data line of an ISDN telecommunications network. But connection DX1 can also lead through an online data network, e.g. through the online data network ODN, which can be the Internet. However, to provide a clearer illustration of the connection relations of FIG. 2, this latter embodiment is not shown. Similarly, server SER could also be connected with exchanges EX2 and EX3 via connections DX2 and DX3, respectively.

In the embodiment of FIG. 2, it is again advantageous if the subscriber's access authorization is checked before he is actually granted access to the telecommunication service data. An example of such access verification has already been described in connection with FIG. 1. In FIG. 2, exchange EX1 can similarly check the subscriber's access authorization after server SER has set up connection DX1. But server SER, in a central function, can also check the subscriber's access authorization for exchanges EX1, EX2, and EX3 and, if the subscriber has authorization, select the exchange involved in the subscriber's access request and set up one of the connections DX1, DX2, or DX3. Furthermore, server SER can check the access authorization in conjunction with exchange EX1 in that the server SER compares, for example, a PIN received from the data terminal DT with a PIN requested from exchange EX1.

After setup of the connection between data terminal DT and exchange EX1 via server SER, the telecommunication service data can be interactively processed on data terminal DT with exchange EX1 as previously explained by means of FIG. 1. In this case, server SER is merely a transparent transmission medium for the data exchanged between data terminal DT and exchange EX1.

Advantageously, server SER can also assume more extensive functions if it requests the current telecommunication service data from exchange EX1 and processes this data for output on an output medium of data terminal DT. For example, server SER can use the aforementioned HTML description language or JAVA applets to embed unprocessed data received from exchange EX1 in the description of a screen record, i.e., it can add explanatory text to the data and display the data in a form in which it can be edited on data terminal DT. Thus, neither exchange EX1 nor exchanges EX2 and EX3 require means for data processing in a description language and the quantity of data transmitted over connection DX1 is reduced. Furthermore, server SER can check the telecommunication service data that has been modified and received from data terminal DT for plausibility and only send data that has passed this plausibility check to exchange EX1 for storage. This relieves exchange EX1 from having to conduct the plausibility check.

What is claimed is:

1. A method for managing a subscriber's telecommunication service data stored in an exchange (EX1) involving the steps of:

a data terminal (DT) of the subscriber sets up a connection to the exchange (EX1) via an online data network (ODN), the data terminal (DT) sends to the exchange (EX1) an access request by the subscriber requesting access to the exchange (EX1), the exchange (EX1) receives the access request, the exchange (EX1) and the data terminal (DT) process the data interactively, whereby the exchange (EX1) outputs the data to the data terminal (DT) and the data terminal (DT) sends data to the exchange (EX1) at least if the data was modified on the data terminal (DT), the exchange (EX1) saves any modified data, and the data terminal (DT) or the exchange (EX1) terminates the connection to the exchange (EX1) via the online data network (ODN).

2. A method according to claim 1 characterized in that the access request is checked before the data is processed to determine whether the subscriber is authorized to access the data.

3. A method according to claim 1 characterized in that the telecommunication service data concerns settings, e.g., entries or modifications of telecommunication services.

4. A method according to claim 1 characterized in that the Internet is used as the online data network (ODN).

5. A method according to claim 1 characterized in that the connection between the exchange (EX1) and the data terminal (DT) is set up by a server (SER), which selects the exchange (EX1) as the one involved from a plurality of exchanges (EX1, EX2, EX3) in that the server (SER) determines in which exchange (EX1, EX2, EX3) the subscriber's telecommunication service data is stored.

6. A server (SER), which can be, or is, connected with a plurality of exchanges (EX1, EX2, EX3), in which subscribers' telecommunication service data is stored, respectively, and which can be, or is, connected with a subscriber's data terminal (DT) via an online data network (ODN), characterized in that the server (SER) has means, upon receipt of a subscriber's access request sent from the data terminal (DT) requesting access to telecommunication service data stored in one of the exchanges (EX1, EX2, EX3), to set up a connection to that exchange (EX1) among exchanges (EX1, EX2, EX3) in which the subscriber's telecommunication service data is stored, that the server (SER) has means to check the access request to determine whether the subscriber is authorized to access the data, that the server (SER) has means to receive data from the exchange (EX1) and transfer it to the data terminal (DT), that the server (SER) has means to receive data from the data terminal (DT) and transfer it to the exchange (EX1) at least if the data has been modified on the data terminal (DT).

7. A server (SER) according to the preamble of claim 6 characterized in that the server (SER) has means, upon receipt of a subscriber's access request sent from the data terminal (DT) requesting access to telecommunication service data stored in one of the exchanges (EX1, EX2, EX3), to set up a connection to that exchange (EX1) among exchanges (EX1, EX2, EX3) in which the subscriber's telecommunication service data is stored, that the server (SER) has means to request data from the exchange (EX1), that the server (SER) has means to output data to the data terminal (DT), that the server (SER) has means to receive data from the data terminal (DT), and that the server (SER) has means to at least send data to the exchange (EX1) if the data has been modified on the data terminal (DT).

8. A server (SER) according to claim 7 characterized in that the server (SER) has means to check the access request to determine whether the subscriber is authorized to access the data.

9. An exchange in which a subscriber's telecommunication service data is stored and which can be connected with a subscriber's data terminal (DT) via an online data network (ODN) characterized in that the exchange (EX1) has means to receive a subscriber's access request sent from the data terminal (DT) requesting to access the subscriber's telecommunication service data, that the exchange (EX1) has means to output data to the data terminal (DT), that the exchange (EX1) has means to receive data from the data terminal (DT), and that the exchange (EX1) has means to store data at least if the data has been modified on the data terminal (DT).

\* \* \* \* \*